US008726730B1

(12) United States Patent
Nielson et al.

(10) Patent No.: US 8,726,730 B1
(45) Date of Patent: May 20, 2014

(54) OPTICALLY TRANSDUCED MEMS GYRO DEVICE

(75) Inventors: Gregory N. Nielson, Albuquerque, NM (US); Gregory R. Bogart, Corrales, NM (US); Eric Langlois, Albuquerque, NM (US); Murat Okandan, Edgewood, NM (US)

(73) Assignee: Sandia Corporation, Albuquerque, NM (US)

( * ) Notice: Subject to any disclaimer, the term of this patent is extended or adjusted under 35 U.S.C. 154(b) by 277 days.

(21) Appl. No.: 13/325,683

(22) Filed: Dec. 14, 2011

(51) Int. Cl.
*G01P 3/00* (2006.01)
*G01C 19/00* (2013.01)

(52) U.S. Cl.
USPC .................................. 73/504.01; 73/504.12

(58) Field of Classification Search
USPC ............... 73/504.01, 504.04, 504.12, 514.26, 73/653; 356/459–460, 472, 476; 359/566, 359/569
See application file for complete search history.

(56) References Cited

U.S. PATENT DOCUMENTS

| | | | |
|---|---|---|---|
| 6,044,705 A * | 4/2000 | Neukermans et al. | 73/504.02 |
| 6,392,220 B1 * | 5/2002 | Slater et al. | 250/216 |
| 6,473,187 B1 * | 10/2002 | Manalis | 356/521 |
| 6,546,798 B1 * | 4/2003 | Waters et al. | 73/504.01 |
| 6,628,392 B2 * | 9/2003 | Kuroda et al. | 356/400 |
| 6,914,710 B1 * | 7/2005 | Novotny et al. | 359/291 |
| 7,091,715 B2 * | 8/2006 | Nemirovsky et al. | 73/514.26 |
| 7,173,764 B2 | 2/2007 | Carr et al. | |
| 7,339,738 B1 | 3/2008 | Carr et al. | |
| 7,743,661 B2 * | 6/2010 | Berthold et al. | 73/653 |
| 8,205,497 B1 * | 6/2012 | Okandan et al. | 73/514.26 |
| 2012/0198935 A1 * | 8/2012 | Samson et al. | 73/514.26 |

OTHER PUBLICATIONS

"In-plane Nano-G accelerometer based on optical resonant detection system," by Krishnamoorthy et al. from Sandia National Laboratories, dated 2006, 2 pages.

* cited by examiner

*Primary Examiner* — Helen Kwok
(74) *Attorney, Agent, or Firm* — Helen S. Baca (57) ABSTRACT

A bulk micromachined vibratory gyro in which a proof mass has a bulk substrate thickness for a large mass and high inertial sensitivity. In embodiments, optical displacement transduction is with multi-layer sub-wavelength gratings for high sensitivity and low cross-talk with non-optical drive elements. In embodiments, the vibratory gyro includes a plurality of multi-layer sub-wavelength gratings and a plurality of drive electrodes to measure motion of the proof mass induced by drive forces and/or moments and induced by the Coriolis Effect when the gyro experiences a rotation. In embodiments, phase is varied across the plurality gratings and a multi-layer grating having the best performance is selected from the plurality.

20 Claims, 9 Drawing Sheets

OPTICALLY TRANSDUCED MEMS GYRO DEVICE

GOVERNMENT INTERESTS

Embodiments of the invention were developed under Contract No. DE-AC04-94AL85000 between Sandia Corporation and the U.S. Department of Energy. The United States Government has certain rights in this invention.

CROSS REFERENCE TO RELATED APPLICATIONS

This application is related to U.S. patent application Ser. No. 13/326,139, filed Dec. 14, 2011, entitled OPTICALLY TRANSDUCED MEMS MAGNETOMETER, to Nielson, et al., the entirety of which is incorporated herein by reference for all purposes.

TECHNICAL FIELD

The present invention generally relates to Micro Electro-Mechanical System (MEMS) sensors, and more particularly to vibratory gyroscopes.

BACKGROUND

Gyroscopes are used as sensors for sensing angular velocity or angular acceleration generated by rotation of a movable body. Both mechanical and vibratory gyroscopes are common in the art with vibratory gyroscopes typically formed using MEMS manufacturing processes which generally utilize semiconductor fabrication techniques. Vibratory gyroscopes typically drive a suspended proof mass, such as a tuning fork, etc., to mechanically resonate in a first dimension relative to a support and when the gyroscope experiences a rotation, the Coriolis effect couples energy from the from the excited resonance to an orthogonal (sensed) dimension. A rotation rate (e.g., °/sec) is then determined from the measured amplitude of the coupled energy.

The Coriolis force for a vibratory gyroscope is of the form $F_c = 2mQ-V$, where Q is the angular velocity experienced by the gyroscope, in is the mass weight of the proof mass, and V is the vibratory velocity. Larger mass is therefore advantageous for improved measurement sensitivity. For typical device operation, a change in capacitance between the proof mass and support resulting from the Coriolis force is measured, for example by converting the magnitude of the capacitance to a voltage and/or determining a voltage required to eliminate the movement of the proof mass in the second dimension. In order to improve a sensing capacity of the vibratory gyroscope, capacitive coupling between the suspended proof mass and the support is made large by minimizing the spacing between the proof mass and the support in at least the sensed dimension.

As the artisan will appreciate, it is difficult to fabricate a proof mass having large mass and also a large capacitive coupling factor. To provide adequate capacitance, gap spacing between capacitively coupled faces of the suspended proof mass and the support have been driven down to nanometers using advanced thin film techniques (e.g., conformal depositions, anisotropic plasma etches, etc.). However, pursuit of such thin film micromachining techniques have limited the mass dimensions significantly in the thickness direction (out of the plane of the MEMS device), typically to tens of microns. Even where advanced wafer bonding and transferred substrate techniques are employed, a released proof mass will generally have a thickness no more than a few hundred microns (μm). As such, the proof mass dimensions are limited by the finite surface area available in a given substrate and/or stress in the thin films.

While deep substrate etches have long been utilized in bulk micromachining techniques, as yet, anisotropic etch performance limits lateral dimensions of deep trenches to many tens of microns. As this large lateral dimension significantly limits capacitive coupling, bulk micromachined vibratory gyroscopes have yet to achieve advantageous performance metrics.

SUMMARY OF THE DESCRIPTION

Embodiments of the present invention include a bulk micromachined vibratory gyro in which a proof mass has a bulk substrate thickness for a large proof mass and high inertial sensitivity.

In embodiments, optical displacement transduction is performed with multi-layer sub-wavelength gratings for high sensitivity and low cross-talk with non-optical drive elements. In embodiments, the vibratory gyro includes a plurality of multi-layer sub-wavelength gratings for measuring motion of the proof mass induced by drive forces and/or moments and induced by the Coriolis Effect when the gyro experiences a rotation. For example, a width of the multi-layer grating apertures along a dimension of the plane of the support is to vary in response to the rotation. In certain embodiments, the vibratory gyro includes a plurality of multi-layer sub-wavelength gratings. Phase between the layers of the multi-layer grating may be varied across the plurality such that manufacturing tolerances may be accounted for by selecting from the plurality of multi-layer gratings, one grating having the best performance.

In embodiments, a bulk micromachined vibratory gyro includes at least one capacitive drive element. A plurality of drive electrodes may further be utilized in a bulk micromachined vibratory gyro where a face of the proof mass opposes a first and second electrically independent face of the support with at least one of the first and second electrically independent support faces to capacitively impart the drive force to a face of the proof mass. In further embodiments, both the first and second electrically independent support faces are driven by different signals to capacitively impart a torque on the suspended proof mass, for example to maximize orthogonality of the drive and sense modes to further reduce cross-talk.

BRIEF DESCRIPTION OF THE DRAWINGS

Embodiments of the present invention are illustrated by way of example, and not limitation, in the figures of the accompanying drawings in which.

DETAILED DESCRIPTION

Described herein are bulk micromachined vibratory gyros. In the following description, numerous details are set forth, however, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not mutually exclusive.

The terms "coupled" and "connected," along with their derivatives, may be used herein to describe structural relationships between components. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g., as in a cause and effect relationship).

The terms "over," "under," "between," and "on" as used herein refer to a relative position of one material layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer.

Figure 1A:
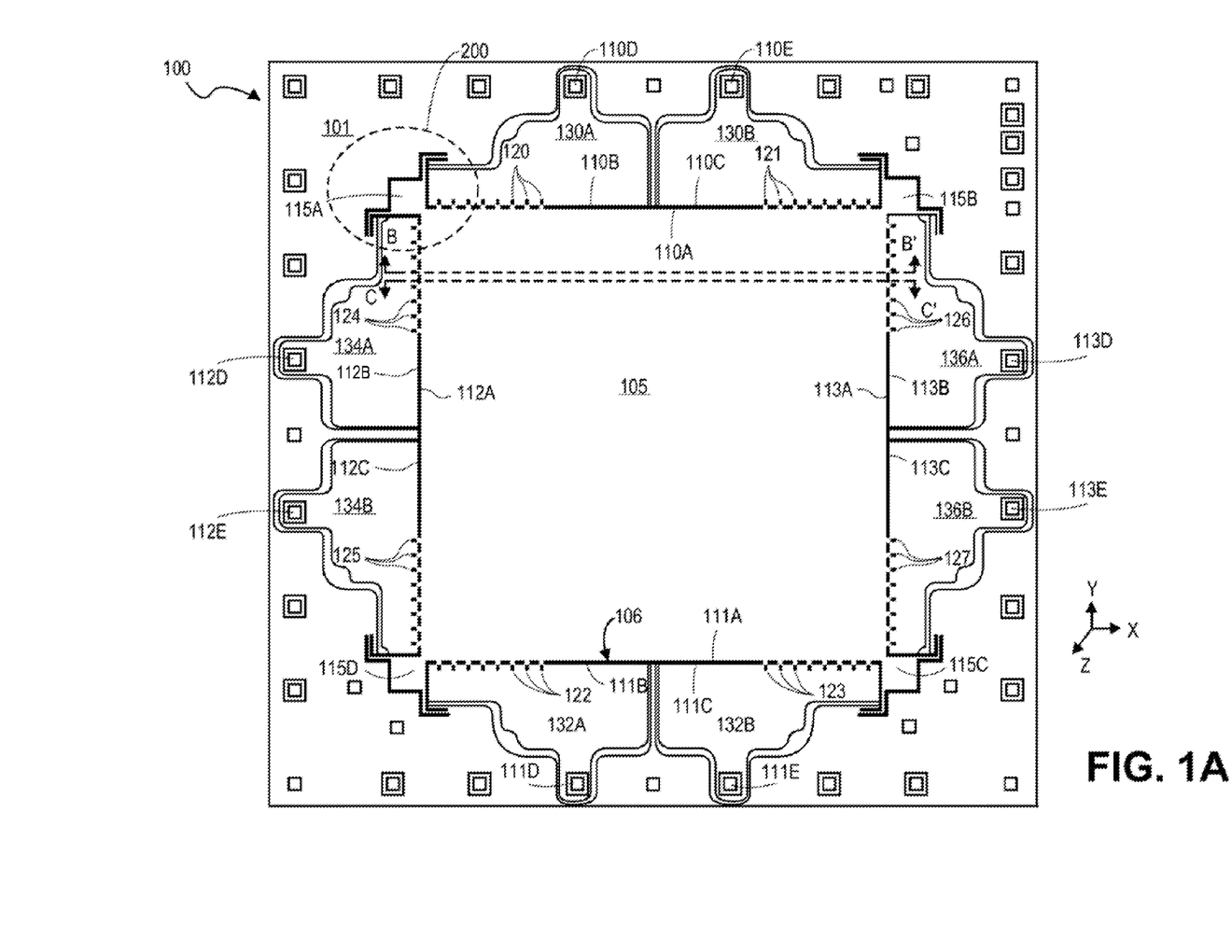
FIG. 1A illustrates a plan view of a bulk micromachined vibratory gyro, in accordance with an embodiment of the invention.
Figure 1B:
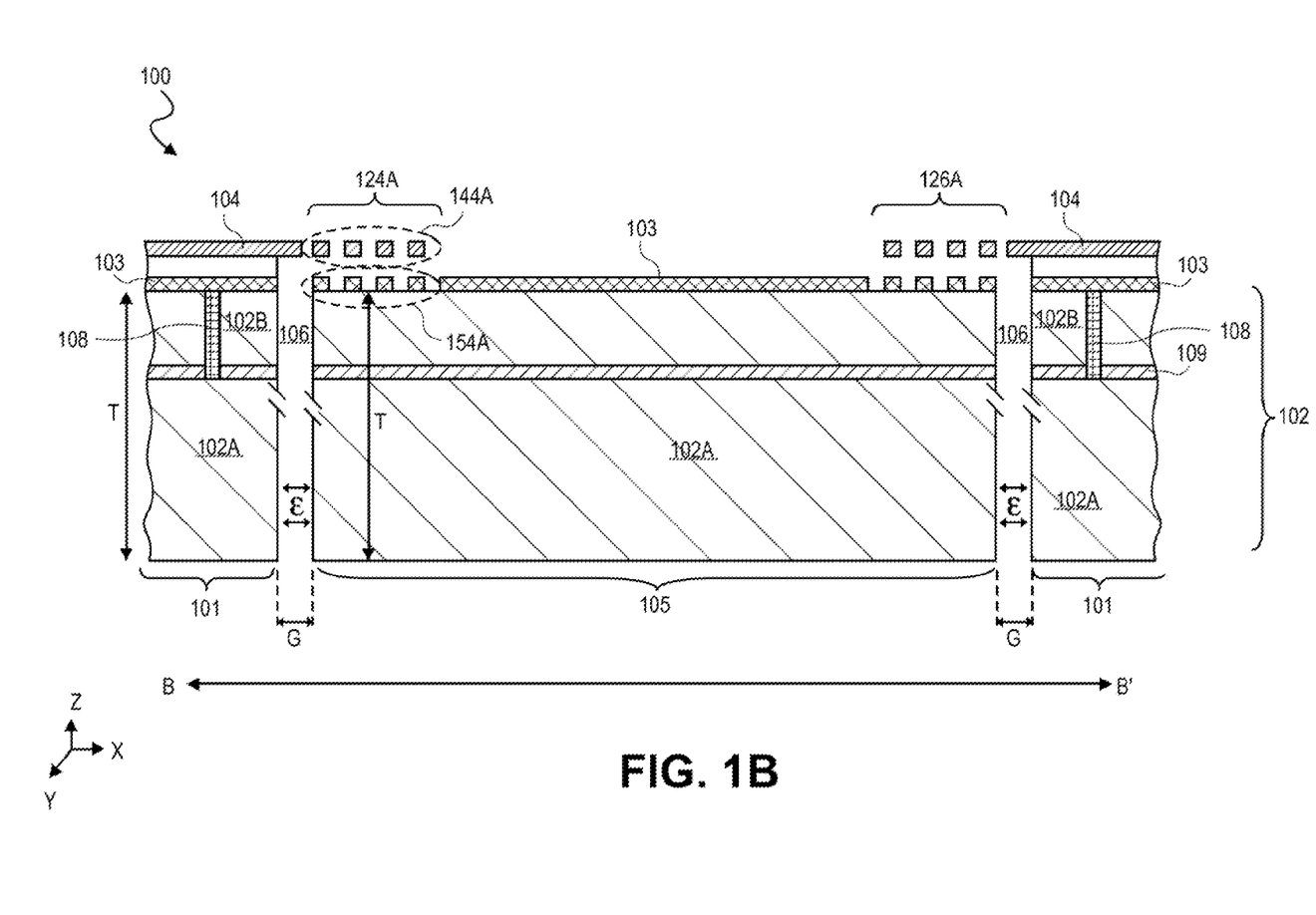
FIGS. 1B and 1C illustrate cross-sectional views of the bulk micromachined vibratory gyro illustrated in FIG. 1A, in accordance with an embodiment.
Figure 1C:
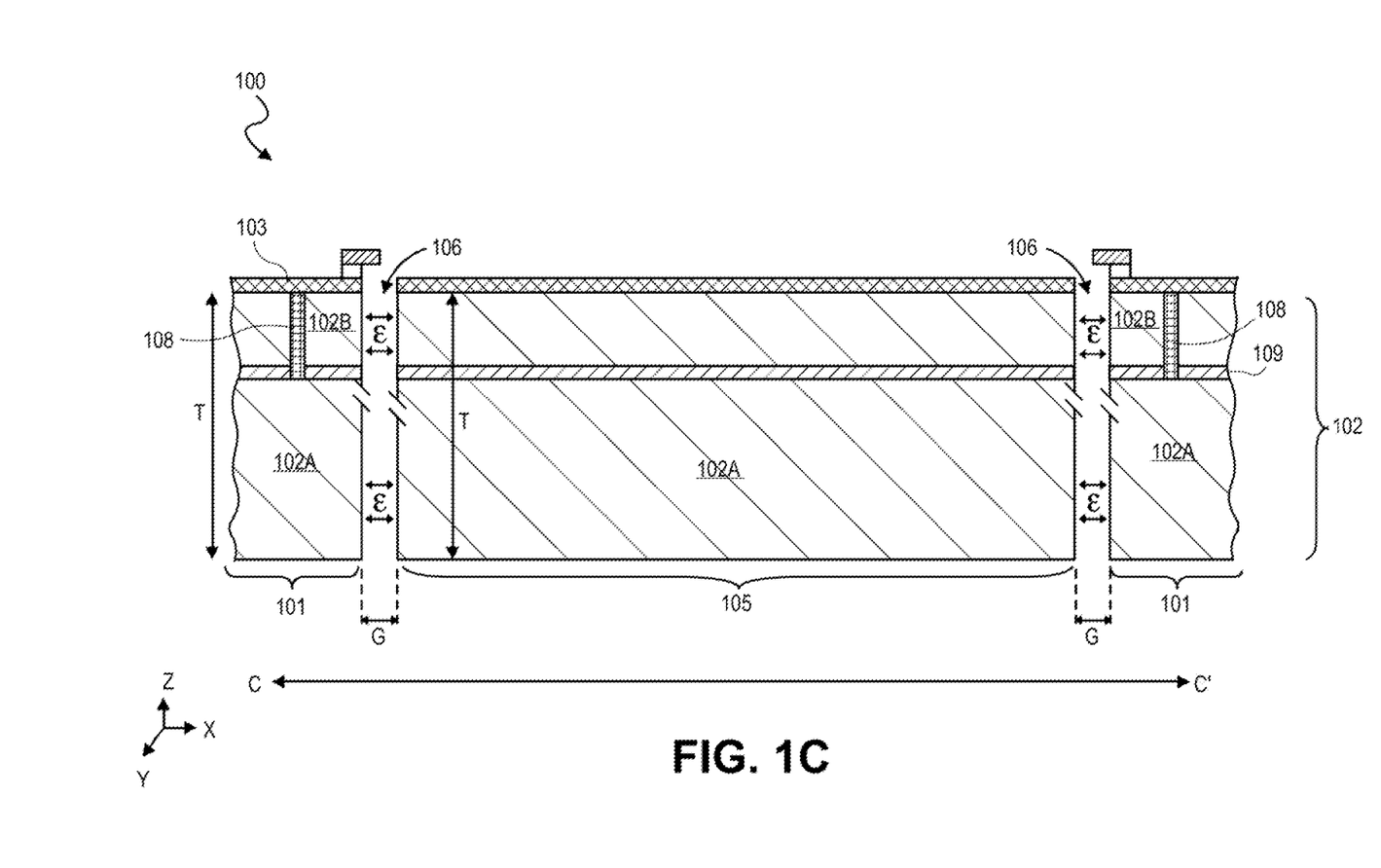

FIG. 1A illustrates a plan view of a bulk micromachined vibratory gyro 100, in accordance with an exemplary embodiment of the invention. FIGS. 1B and 1C illustrate cross-sectional views of the bulk micromachined vibratory gyro 100 along the B-B' and C-C' lines illustrated in FIG. 1A, respectively. As used herein, in a "bulk micromachined" vibratory gyro the suspended proof mass (e.g., proof mass 105 in FIG. 1A) is physically separated from a support (e.g., frame 101 in FIG. 1A) by a through substrate via/trench (e.g., trench 106). As such, the proof mass has substantially the bulk substrate thickness (i.e., approximately the same thickness as the support) which serves to greatly increase the mass dimensions relative to a conventional thin film MEMs gyro.

As further illustrated in FIG. 1A, the bulk micromachined vibratory gyro 100 includes at least one deformable diffractive optical structure (e.g., a multi-layer grating 124A) disposed on a top side (or alternatively a bottom side) of the gyro 100 for optical domain transduction of the proof mass displacement. Transduction in the optical domain enables the proof mass to be bulk machined for larger mass dimensions without suffering performance loss that would otherwise occur if capacitive sensing was employed. Furthermore, with the deformable diffractive optical structures disposed only on a top and/or backside of the device, the entire perimeter of a proof mass becomes available for motion control rather than functionally dividing the proof mass perimeter between motion sense and control. Transduction in the optical domain also enables the bulk micromachined gyroscope 100 to be fabricated simultaneously with the Lorentz magnetometer described in the above referenced U.S. Patent Application, entitled OPTICALLY TRANSDUCED MEMS MAGNETOMETER, to Nielson, et al. A multi-axis inertial sensor of superior sensitivity may be provided with both inertial and magnetic sensing functions provided by multiple such optically transduced MEMS devices monolithically integrated on a same substrate. As such, in certain advantageous embodiments, one or more of the MEMS bulk micromachined gyroscopes described herein are provided in combination with one or more MEMS magnetometers.

In embodiments, a bulk micromachined vibratory gyro includes a support and at least one proof mass suspended from the support. Examples of more than one proof mass include a tuning fork vibratory gyroscope. It is understood that based on the illustrative single proof mass embodiments provided herein, one of skill in the art may readily adapt a conventional thin film tuning fork vibratory gyro design, or other multi-mass gyro known in the art, to incorporate one or more of the techniques described herein, such as optical domain transduction, bulk machining, etc.

In the exemplary embodiment depicted in FIG. 1A, the support 101 forms a frame completely surrounding a proof mass 105. As further shown in FIGS. 1B and 1C, both the support 101 and the proof mass 105 have at least a bulk substrate thickness, T. As such, the proof mass 105 and the support 101 have substantially the same thickness with minor thickness differences between the two arising from differences in the thin film processing over the substrate 102 for one or the other of the proof mass 105 and the support 101. For example, one or more layers of thin film materials such as silicon dioxide, polysilicon, silicon nitride, electrode metallization, (layers 103 and 104 in FIGS. 1A and 1B) etc. utilized in the fabrication of the bulk micromachined vibratory gyro 100 may be present to differing extents between the support 101 and the proof mass 105.

Generally, the bulk substrate thickness, T may vary depending on convention for the material selected for the substrate 102 (FIG. 1B). While, the substrate 102 may generally be any material suitable for semiconductor device fabrication, in advantageous embodiments a bulk substrate composed of a poly or single crystalline material such as, but is not limited to, silicon, germanium, silicon-germanium, or a III-V compound semiconductor material is utilized. In embodiments, the substrate 102 has conductivity sufficient for a voltage applied for capacitive drive of the proof mass to pass through the entire bulk substrate thickness T without detrimental voltage drop. For example, impurity doped substrates may be utilized, as known in the art. In a preferred embodiment, the substrate 102 is a semiconductor (silicon) on insulator (SOI) substrate having a buried insulator layer 109 (e.g., silicon dioxide) spanning the entire area of the substrate 102, as known in the art. For such embodiments, the bulk substrate thickness T includes both a base semiconductor substrate portion 102A disposed below the buried layer 109, and also an overlying semiconductor substrate portion 102B. Generally, the bulk substrate thickness, T is to be at least 500 µm. In a preferred embodiment where the substrate material is silicon (e.g., a single crystal silicon wafer), the bulk substrate thickness, T will be approximately 700 µm (i.e. between about 650 µm and about 750 µm). With T being nearly 1 mm, structural integrity of the proof mass 105 is substantially greater than for a thin film proof mass and therefore the proof mass 105 may also have very large lateral (in-plane) dimensions, for example 4-10 mm on a side for a mass in the 0.001 to 1 gram range.

As shown in FIG. 1A, delineation of the proof mass 105 from the support 101 is by the trench 106 that is nearly continuous with the only discontinuities occurring at a flexure anchor point. As further shown in FIGS. 1B and 1C, the trench 106 has a lateral gap dimension, G, defining the critical dimension and aspect ratio of the trench 106. As the trench 106 passes completely through the substrate 102, the trench 106 is at least 500 µm deep (e.g., as measured from a bottom side of the substrate 102) and approximately 700 µm deep for the exemplary silicon substrate embodiments. Because the lateral gap dimension, G, does not limit sensing sensitivity, the dimension may be whatever is sufficient for the amount of proof mass displacement induced in the drive mode and/or otherwise needed for a given deep trench etch process. Generally, the lateral gap dimension, G, is microns wide. In exemplary silicon substrate embodiments, the lateral gap dimension, G, is between 20 µm and 60 µm for an aspect ratio between about 20:1 and 30:1, which is readily attainable using conventional anisotropic silicon etching techniques known in the art.

While a proof mass may generally have any shape, in the exemplary embodiment illustrated in FIG. 1A, the proof mass 105 is substantially square having first parallel opposite sides 110A, 111A extending lengthwise along the x-dimension and second parallel opposite sides 112A, 113A extending lengthwise orthogonal to the first opposite sides 110A, 111A, along the y-dimension. The bulk substrate thickness, T, is therefore orthogonal to the first and second opposite sides, extending out of plane in the z-dimension. As such, the trench 106 defines faces of the proof mass which extend in the z-dimension through the bulk thickness at the opposite sides 110A, 111A, 112A, 113A. Separated from the proof mass faces by the trench 106 are opposing support faces which further include a drive element along their entire lengths (in the x and y dimensions of FIG. 1A). In advantageous embodiments, the entire thicknesses (z-dimension in FIG. 1C) of the support faces function as a drive element interface utilized for drive of the proof mass 105.

In an embodiment, each face of the proof mass opposes a plurality of electrically independent faces of the support. At least one of the electrically independent faces of the support is to impart the drive force or moment to the proof mass via capacitive coupling with a face of the proof mass. This capacitive coupling is illustrated in FIG. 1B by electric field ϵ, which in the preferred embodiment extends through the bulk substrate thickness, T. For the preferred SOI embodiments, capacitive drive is provided across the entire bulk substrate thickness T with conductive vias 108 passing through the buried insulator layer 109 to electrically couple the base semiconductor substrate portion 102A with the overlying semiconductor substrate portion 102B, as shown in FIGS. 1B and 1C. It should be noted that while capacitive sensing requires a small lateral gap dimension, G, for high displacement sensitivity, a small lateral gap dimension is not required for capacitively driving the proof mass given the relatively larger AC amplitude of a drive voltage.

In the exemplary embodiment illustrated in FIG. 1A, the support 101 includes first and second electrically independent support faces 112B, 112C and 113B, and 113C opposing adjacent lengths of the proof mass (112A and 113A). Each side of the proof mass 110A, 111A, 112A and 113A therefore faces a pair of electrically independent support faces 110B,C, 111B,C, 112B,C, and 113B,C. As such, any one of these electrically independent support faces may function as an independent drive electrode 130A, 130B, 132A, 132B, 134A, 134B, 136A, 136B when powered by a signal applied via pads 110D, 110E, 111D, 111E, 112D, 112E, 113D, 113E, respectively. Each electrically independent support face therefore occupies approximately one half of the x and y dimensional lengths of the proof mass. As shown in FIGS. 1A, 1B, and 1C, the drive electrodes extend along the lateral (in-plane) lengths of the proof mass, even subjacent/adjacent the multi-layer gratings (e.g., multi-layer grating 124A depicted).

For the exemplary embodiment where the drive mode is the in x-dimension, at least one of the support faces 112B, 112C and 113B, and 113C is to capacitively impart the drive force to the proof mass 105 during operation. In embodiments where ones of the electrically independent support faces on a given side of the support are driven with different drive signals, a torque may be imparted on the proof mass. This additional degree of motion control can, for example, be utilized in a feedback loop to actively account for variation in the structural characteristics between the flexures 115A, 115B, 115C, and 115D resulting from manufacturing tolerances, or to decouple the proof mass from sources of cross-talk external to a packaged gyro, such as vibration or other environmental factors.

The proof mass 105 is attached to the support 101 via at least one flexure to oscillate in a drive mode relative to the support 101 in response to a drive force. In the illustrative embodiment, the proof mass 105 is to oscillate in the plane of the support 101 only, with oscillation modes out of the plane suppressed by the flexure(s). In other words, the drive mode oscillation is along one of the x-dimension and the y-dimension and the sense mode oscillation is along the other of the x-dimension and the y-dimension. For the sake of clarity of description, the drive mode is defined to be in the x-dimension and the sense mode is in the y-dimension, however the opposite configuration may also be practiced. As shown, the proof mass 105 is attached to the support 101 by four flexures, 115A, 115B, 115C, and 115D, coupling each of four corners of the proof mass 105 to each of four corners of the support 101 where the first opposite sides 110A, 111A intersect with the second opposite sides 112A, 113A. The four flexures 115A, 115B, 115C, and 115D, being defined by the trench 106, also have the bulk substrate thickness.

In an embodiment, the deformable diffractive optical structure employed for optical transduction of proof mass displacement is a multi-layer grating 124A. In the exemplary embodiment, each grating in the multi-layer gratings (e.g. 124A and 126A) is a sub-wavelength grating, however chirped gratings and other forms known in the art may also be employed. As shown in FIG. 1B, the multi-layer grating 124A includes a first grating 144A formed in the support 101 and cantilevered over the trench 106 to be disposed over a second grating 154A formed in the proof mass 105. The first grating 144A may alternatively be formed in the proof mass 105 and cantilevered over the trench 160 to be disposed over the second grating 154A formed in the support 101. Alternatively, both gratings may be cantilevered off their respective bulk supports. Each of the first and second gratings 144A and 154A may be formed in either the substrate 102, or as illustrated in FIG. 1B, in a thin film layer 104, 103, respectively, which is formed on the substrate 102. Exemplary thin film materials include silicon dioxide, silicon nitride and polysilicon, as well as any other material known in the art having adequate thermal stability structural integrity for the geometries and functions described herein.

Grating aperture dimensions vary with displacement of the proof mass 105 relative to the support 101. Depending on the dimension along which the grating is aligned, aperture dimensions vary either in response to drive signal (e.g., in x-dimension) or in the sense mode (e.g., y-dimension) in response to a rotation of the gyro 100. While first-order gratings with feature dimensions significantly larger than a wavelength of light used for the optical transduction (i.e., the operating wavelength) may be used, near field multi-layer gratings are preferred as being capable of modulating the intensity and polarization of an incident light in response to much smaller displacements of the grating elements. Near field multi-layer gratings having line elements of the gratings separated by distances which are less than the operating wavelength are known to modulate the intensity of reflected or transmitted zero orders even when displacement in-plane of the grating is only fractions of a wavelength. For a detailed description of such near field multi-layer gratings, the interested reader is referred to the commonly assigned U.S. Pat. Nos. 7,173,764 and 7,339,738 to Carr et al., and incorporated herein by reference in its entirety for all purposes. The sub-wavelength displacement sensitivity possible with the near field multi-layer grating, when provided with the increased proof mass dimensions provided by bulk micromachining, a level of inertial sensitivity heretofore unknown can be achieved.

In an embodiment, a bulk machined vibratory gyro includes a plurality of near field multi-layer gratings. In an embodiment, at least one multi-layer grating having apertures aligned with each in-plane dimension is disposed at each corner of the proof mass 105. As shown in FIG. 1A, the gyro 100 includes a first plurality of multi-layer gratings 120 having aperture lengths extending along the x-dimension in a one dimensional array across the side 110A of the proof mass (and across the electrically independent support face 110B). A second plurality of multi-layer gratings 124 is in a one dimensional array across the orthogonal side 112A of the proof mass. Additional multi-layer grating arrays 122 and 126 are present on the opposite proof mass sides 111A, 113A. In the exemplary embodiment illustrated in FIG. 1A, a second one dimensional multi-layer grating array 121 is disposed at a second end of the side 110A, opposite the first plurality of multi-layer gratings 120. With each side of the proof mass 105 and support 101 having two one dimensional multi-layer grating arrays (122, 123 and 124,125 and 126, 127), each flexure 115A, 115B, 115C, and 115D is adjacent to a multi-layer grating arrayed along each of the in-plane dimensions. Sensitivity to forces and moments experienced by the proof mass 105 is maximized with the multi-layer grating arrays disposed in the corners of the proof mass 105.

Figure 2A:
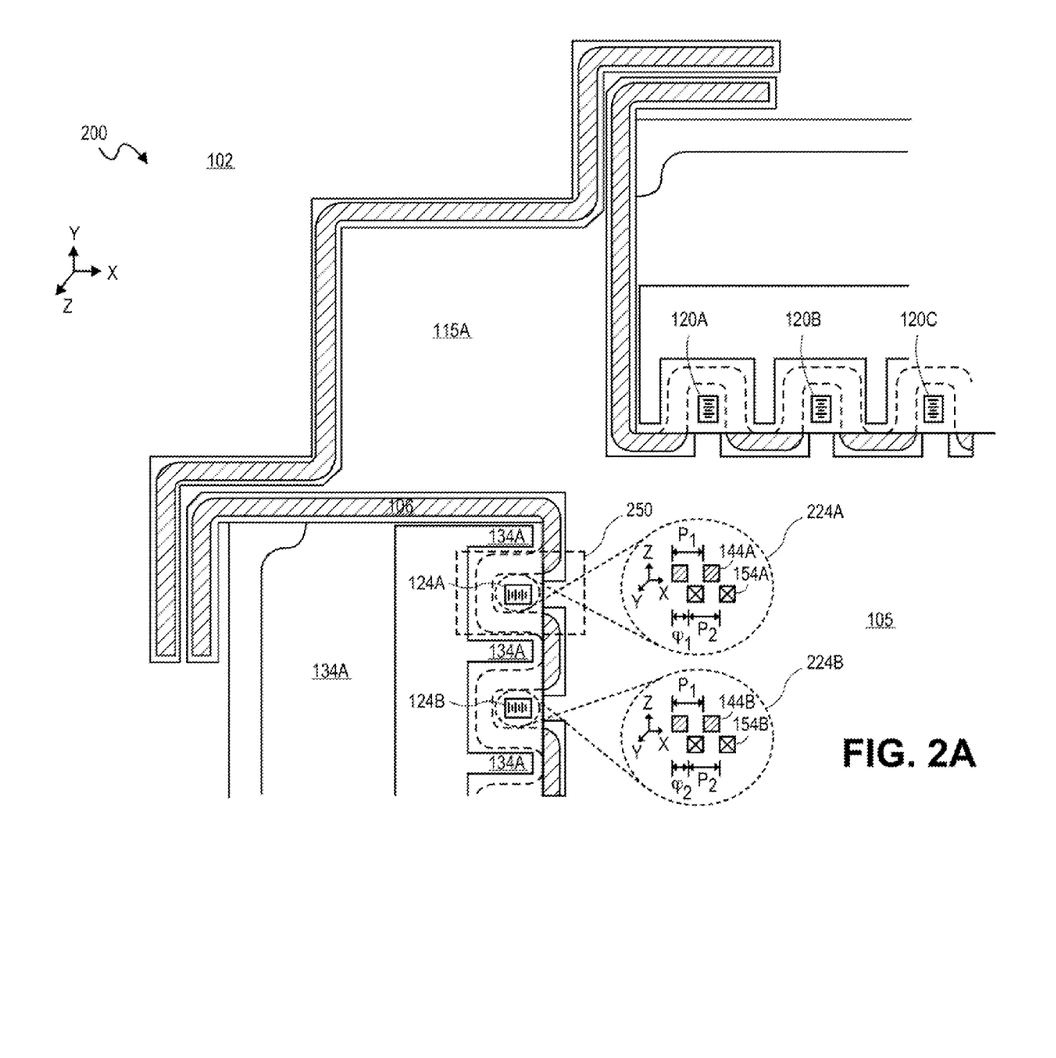
FIG. 2A illustrates an expanded plan view of the bulk micromachined vibratory gyro illustrated in FIG. 1A, in accordance with an embodiment.

In an embodiment, across the plurality of arrayed multi-layer gratings, line elements in the gratings of each multi-layer grating have a same pitch, but an alignment offset between the gratings is different across the plurality of multi-layer gratings so that phase between the overlapping gratings is modulated across the plurality of multi-layer gratings. FIG. 2A illustrates an expanded plan view 200 of a portion of the bulk micromachined vibratory gyro 100. The expanded plan view 200 illustrates multi-layer gratings 120A, 120B, 120C, arrayed in the x-dimension, and multi-layer gratings 124A and 124B, arrayed in the y-dimension. Inset within FIG. 2A, cross-sectional views 224A and 224B further illustrate two multi-layer gratings 124A and 124B. The cross-sectional view 224A illustrates line elements in the first grating 144A with a first pitch $P_1$, defining a period of the first grating 144A. Similarly, line elements in the second grating 154A have a second pitch $P_2$. The pitches $P_1$ and $P_2$ may be substantially equal to each other, but are not necessarily so. Alignment between the first and second gratings 144A and 154A defines a phase $\phi_1$ for the first multi-layer grating 124A.

In the cross-sectional view 224B, line elements in the first grating 144B have the first pitch $P_1$. Similarly, line elements in the second grating 154B have the second pitch $P_2$. As such, between the two multi-layer gratings 124A and 124B, the pitches of respective gratings are equal. Alignment between the first and second gratings 144B and 154B is however different from that between the gratings 144A and 154A to define a phase $\phi_2$ for the second multi-layer grating 124B that is different from the phase $\phi_1$. In one exemplary embodiment, the difference in phase between adjacent ones of the arrayed gratings is 10-20 nm so that over the eight multi-layer gratings arrayed in each of two dimensions at the corners of the proof mass 105, phase is varied by 80-150 nm. Varying the phase $\phi$ across an arrayed plurality of multi-layer gratings enables an inertial sensing system incorporating the bulk micromachined vibratory gyro 100 to undergo a functional test where gratings in each array may be binned out to identify the grating having a phase, $\phi_n$, that satisfies predetermined threshold criteria, for example results in the greatest displacement induced modulation of (zeroth order) light intensity. Variation in the fabrication process may therefore be accounted for to advantageously improve sensitivity. In an alternate embodiment, more than one multi-level grating may be utilized for displacement transduction. For example, differential measurements may be performed and/or a comb filter or other filtering may be applied to combine outputs from more than one multi-level grating in each array and remove common mode noise, etc. as known in the art of electrical signal conditioning.

Figure 2B:
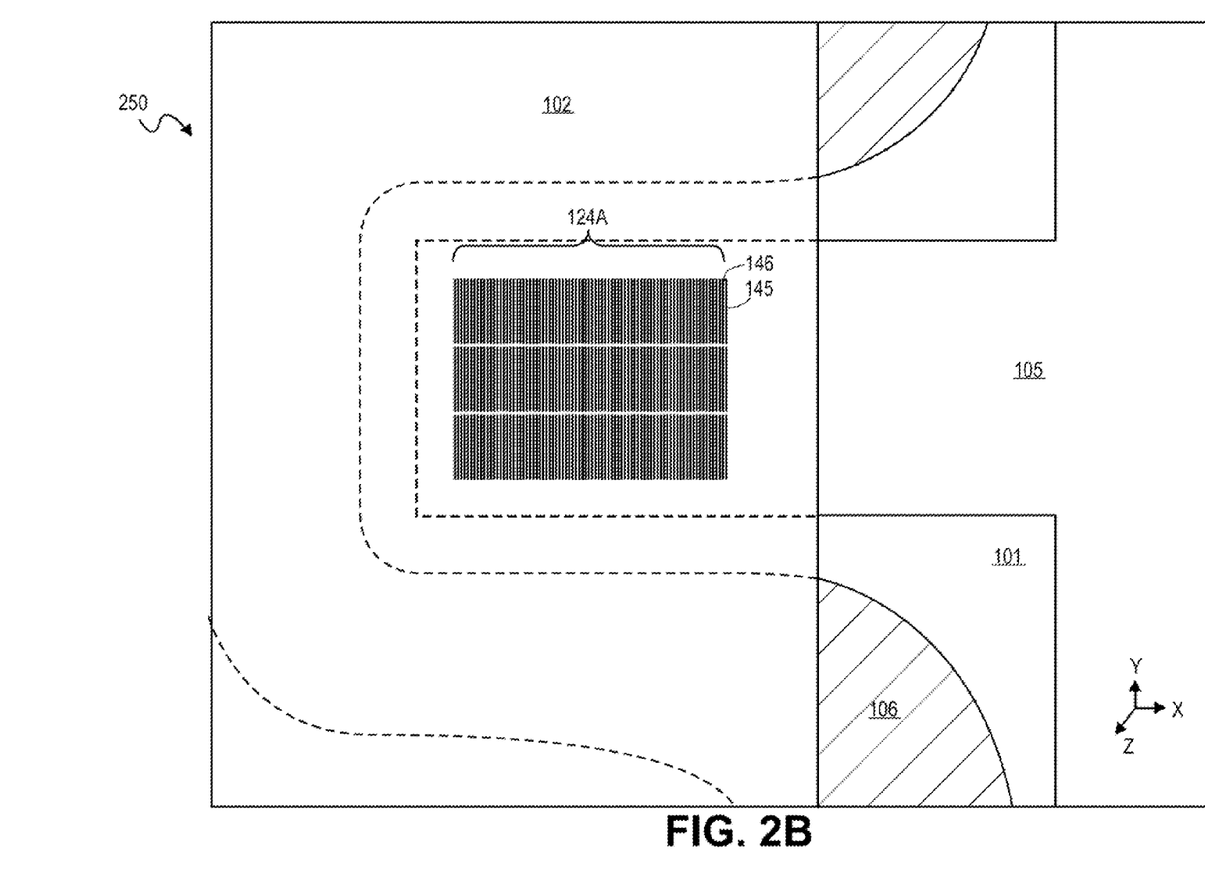
FIG. 2B illustrates an expanded plan view of a multi-layer grating in the bulk micromachined vibratory gyro illustrated in FIG. 2A, in accordance with an embodiment.

As further depicted in the expanded plan view 200 in FIG. 2A, and in FIG. 2B showing an expanded plan view 250 of the multi-layer grating 124A, the trench 106 is serpentine in the region of the arrayed multi-layer gratings, with a portion of the trench 106 passing under (represented by dashed lines) the first grating 144A cantilevered from the support 101. Notably, the dimensions of the serpentine are much smaller than those of the proof mass, in contrast to conventional devices which rely on capacitive sensing (and therefore often have comb structures with lengths on the order of the proof mass dimensions). For example, in the exemplary embodiment where the proof mass dimensions in the x-y plane are over 4 mm on a side, the trench 106 serpentines by 150-200 μm in delineation of the proof mass platform upon which the second grating (e.g., second grating 154A) is formed. FIG. 2B further illustrates apertures 145 and intervening line elements 146 having major lengths in an x-y plane parallel to the plane of the support to define the first grating period along the x-dimension and therefore to transduce drive mode displacement. On orthogonal sides of the proof mass 105 (e.g., 110A and/or 111A) similar apertures and intervening line elements have major lengths defining the first grating period along the y-dimension to transduce sense mode displacement of the proof mass 105. As shown in FIG. 1B, the second grating comprises a similar plurality of regularly spaced line elements in a second plane parallel to the plane of the support separated in the z-dimension from the first line elements.

Figure 3A:
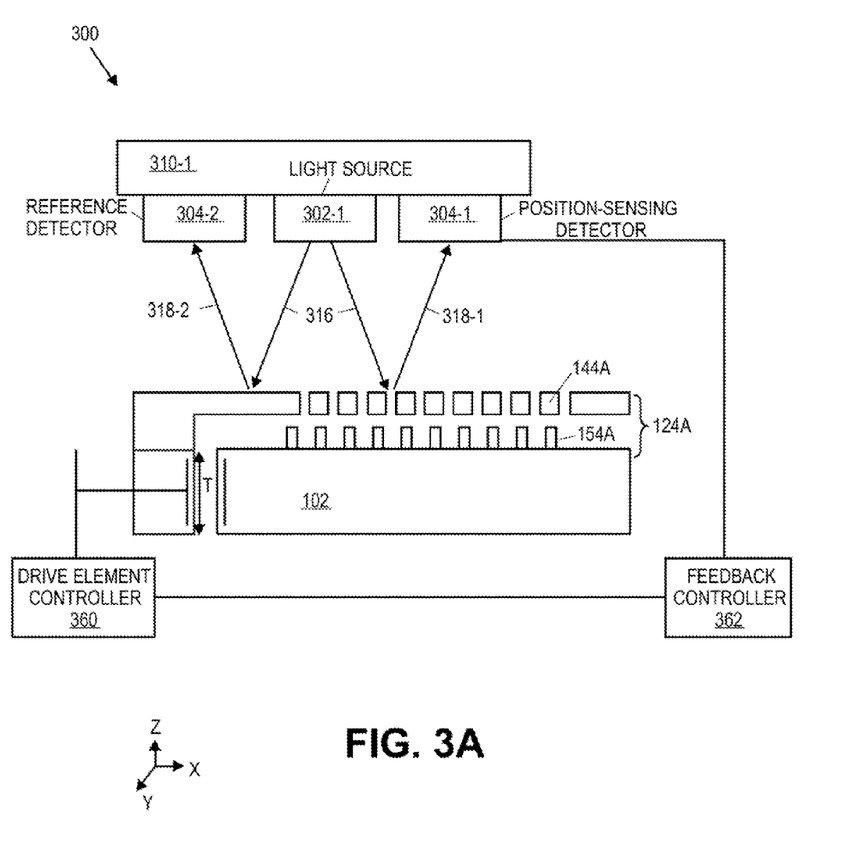
FIGS. 3A and 3B illustrate an inertial sensor, in accordance with an embodiment.
Figure 3B:
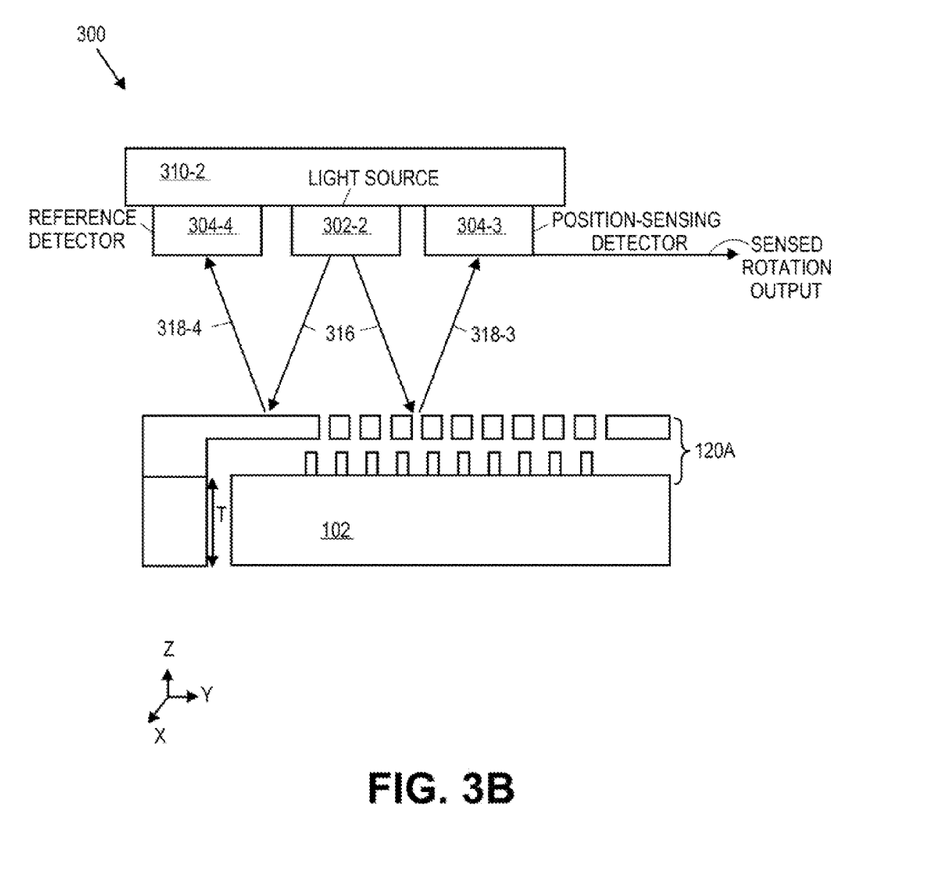

FIGS. 3A and 3B illustrate an inertial sensor 300 employing the bulk micromachined vibratory gyro 100, in accordance with an embodiment. For the exemplary embodiment, the inertial sensor 300 utilizes the multi-layer grating 124A as a reflective grating, however a sensor employing a transmissive grating may be similarly designed (e.g., where both the first and second gratings 144A and 154A are cantilevered off their respective bulk structures). In the inertial sensor 300, a light source 302-1 is provided on a substrate 310-1 together with a pair of detectors 304. Exemplary light sources for interrogating the multi-layer grating 124A include a VCSEL or an LED.

For the exemplary linear grating, light having a specific wavelength (i.e., operating wavelength) is diffracted into modes that emerge along multiple discrete angles. For the preferred near field grating embodiments where the multi-layer gratings are "sub-wavelength," the light source 302 is to emit an incident light beam 316 at a wavelength that is greater than the pitch of the grating (either the first grating 144A or second grating 154A, although in the preferred embodiment where the both the first and second grating have the same pitch, the wavelength is greater than the pitch of both first and second gratings). The sub-wavelength grating has only a zeroth-order mode and a surface wave mode. When optically coupled, varying the offset between the two gratings allows for modulation of the light between transmission and reflection in the zeroth order mode.

Exemplary detectors 304 include a PIN photodiode, an active pixel sensor (APS), or the like. In one near field embodiment, the first photodetector 304-1 is to measure an intensity of zeroth-order light modulated by the multi-layer grating 124A, though other orders may also be sensed. The first photodetector 304-1 (i.e., a position sensing detector) is to detect the light portion 318-1 reflected off the multi-layer grating 124A. A second detector 304-2 (i.e., a reference detector) is to detect a light portion 318-2 of the light 16 reflected off a reference surface outside the multi-layer grating 124A (i.e., the reference light portion 318-2 bypasses the multi-layer grating 124A). The reference detector 304-2 provides an electrical output signal which can be combined with the electrical output signal of the detector 304-1 to substantially remove any common-mode noise (i.e., noise due to the light source or other factors which is common to both reflected light portions 318-1 and 318-2) and thereby improve a sensitivity for sensing relative displacement of the second grating 154A disposed on the proof mass. In alternate embodiments of the present invention where a transmitted light portion is detected, a reference detector can be similarly used to detect a portion of the incident light beam 316 which bypasses the multi-layer grating 124A. As further illustrated in FIG. 3A, the inertial sensor 300 includes a detector 304-1 communicatively coupled to a feedback controller 362 (e.g., logic circuits of an FPGA or ASIC) that is further communicatively coupled to a drive element controller 360 (e.g., a drive voltage source) which operate together to maintain the proof mass 105 in a state of resonance (e.g., in the x-dimension).

FIG. 3B illustrates the inertial sensor 300 along the sense dimension (e.g., y-dimension) with a second multi-layer grating 120A on the substrate 102 disposed relative to a second light source 302-2 that is fabricated in a substrate 310-2, which may be the same substrate as 310-1, or a separate (third) substrate. First detector 304-3 and reference detector 304-4 operate in the same manner described for detectors 304-1 and 304-2 to detected light portions 318-3 and 318-4, respectively, but with the position sensing output from first detector 304-3 being a basis for outputting a sensed gyro rotation rate (e.g., °/s).

For the exemplary embodiments employing a plurality of multi-layer gratings arrayed with varying phases for both drive and sense modes, each multi-layer grating having a particular phase is paired with a light source 302 and at least one optical detector 304, for example an array of LEDs or VCSELs may be disposed over the each array of multi-layer gratings. The intensity modulation generated by each multi-layer grating of the arrays may be collected simultaneously (in parallel), or serially sampled in a time divided (e.g., in round robin fashion) or other multiplexed manner.

Figure 4A:
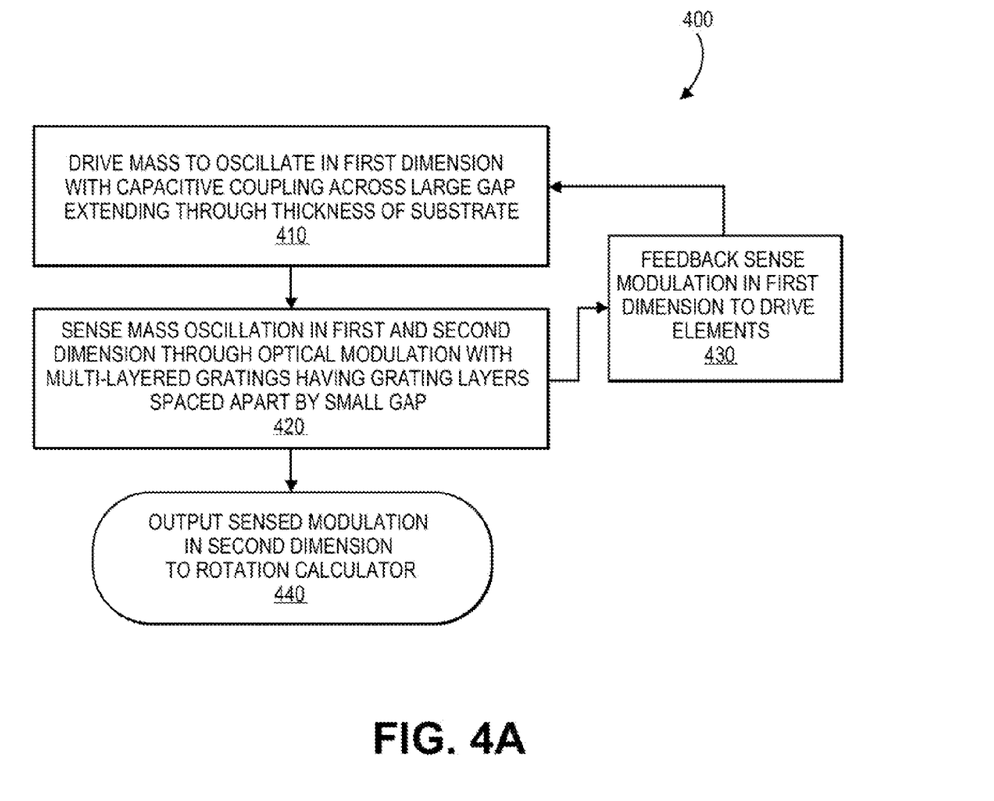
FIG. 4A is a flow diagram illustrating a method of sensing a rotation of a bulk micromachined vibratory gyro, in accordance with an embodiment of the invention.

FIG. 4A is a flow diagram illustrating a method 400 for sensing a rotation of a bulk micromachined vibratory gyro, in accordance with an embodiment. The method 400 may be performed by the inertial sensor 300 when in an operational mode. At operation 410, a proof mass is driven to oscillate in a first dimension through capacitive coupling across a wide gap (e.g., many microns) extending through an entire thickness of a substrate. At operation 420, proof mass oscillation in both the first dimension (driven mode) and second dimension (sensed mode) is determined based on modulation of light intensity by multi-layer gratings having gratings spaced apart by a small gap (e.g., on the order of an incident light wavelength, or sub-wavelength). At operation 430, light intensity modulation sensed in the first dimension is feedback to capacitive drive elements. At operation 440, light intensity modulation sensed in the second dimension is output for determination of a gyro rotation rate.

Figure 4B:
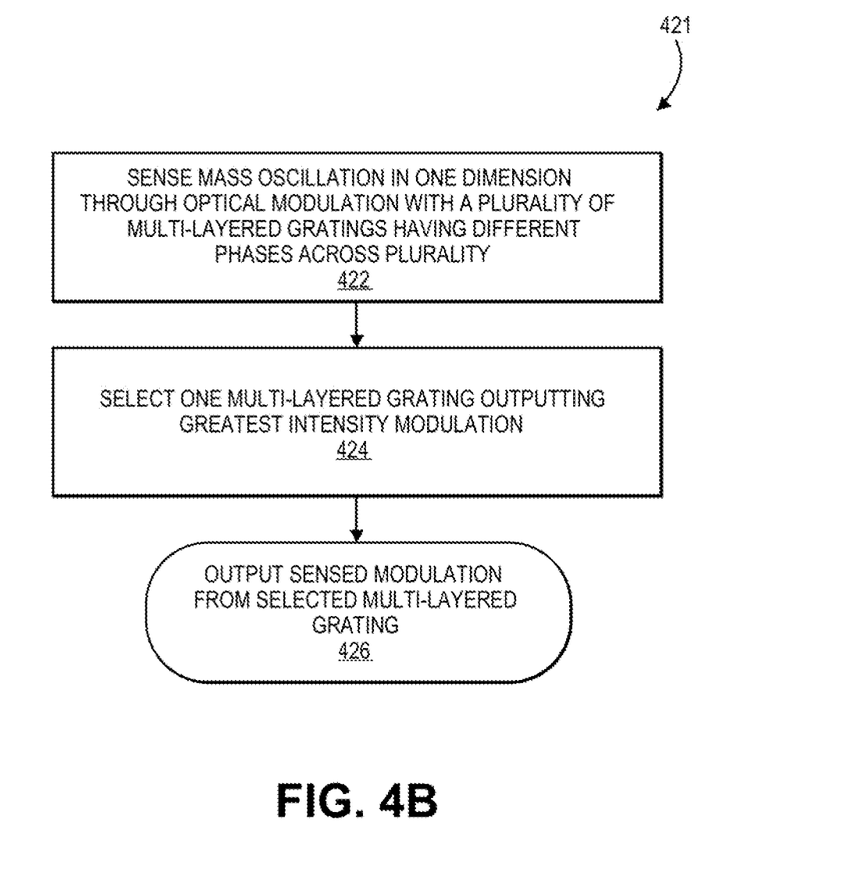
FIG. 4B is a flow diagram illustrating a method of selecting one of a plurality of multi-layered gratings for sensing a rotation of a bulk micromachined vibratory gyro, in accordance with an embodiment of the invention.

FIG. 4B is a flow diagram illustrating a method 421 of selecting one of a plurality of multi-layer gratings for sensing a rotation of a bulk micromachined vibratory gyro, in accordance with an embodiment of the invention. The method 421 may be performed by the inertial sensor 300 as a functional test prior to entering the operational mode to perform method 400. At operation 422, a proof mass oscillation is transduced through optical modulation by a plurality of multi-layer gratings having different phases across the plurality. Operation 422 may be performed by either a plurality of sensors transducing the driven mode or by a plurality of sensors transducing the sensed mode. At operation 424, one multi-layer grating of the plurality (e.g., of the eight multi-layer gratings 120) that outputs the greatest light intensity modulation is selected. The selected multi-layer grating along with the associated light source and detector are identified for further use, for example as the exclusive displacement transducer output from that plurality at operation 426. In a specific embodiment where drive mode transducers are identified at operation 424 (e.g., one at each corner of the proof mass 105), the multi-layer gratings configured for sense mode transduction having the same phase $\phi_n$ as that of the selected drive mode transducers are then further selected at operation 424 as the exclusive displacement transducers for the sense mode (e.g., one at each corner of the proof mass 105) output from that plurality at operation 426.

It is to be understood that the above description is illustrative, and not restrictive. For example, while flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be deter-

What is claimed is:

1. A bulk micromachined vibratory gyro, comprising:
a support including a substrate having a bulk thickness;
a first grating in a layer of the support;
a proof mass having substantially the bulk thickness and attached to the support via at least one flexure to oscillate relative to the support in response to a drive force; and
a second grating in a layer of the proof mass, wherein the first and second gratings overlap to form a multi-layer grating having apertures that vary dimensionally in response to a rotation of the gyro.

2. The vibratory gyro of claim 1, wherein the proof mass is to oscillate in a first dimension of a plane of the support in response to a capacitive drive element, and wherein a width of the multi-layer grating apertures along a second dimension of the plane of the support, orthogonal to the first dimension, is to vary in response to the rotation.

3. The vibratory gyro of claim 2, wherein a face of the proof mass extends in a third dimension through the bulk thickness, orthogonal to the first and second dimensions, the face of the proof mass separated from an opposing face of the support by a gap extending through the bulk thickness of the substrate.

4. The vibratory gyro of claim 3, wherein the bulk thickness is at least 500 μm.

5. The vibratory gyro of claim 3, wherein at least one of: the first grating is cantilevered from a face of the support, or the second grating is cantilevered from a face of the proof mass.

6. The vibratory gyro of claim 3, wherein the proof mass includes a first pair of faces on first opposite sides of the proof mass extending lengthwise in the first dimension and a second pair of faces on second opposite sides of the proof mass extending lengthwise in the second dimension, and wherein the at least one flexure includes four flexures, each flexure disposed at a corner where the first opposite sides intersect with the second opposite sides.

7. The vibratory gyro of claim 6, wherein each face of the proof mass opposes a first and second electrically independent face of the support, with at least one of the first and second electrically independent support faces is to capacitively impart the drive force through the bulk thickness to a face of the proof mass.

8. The vibratory gyro of claim 7, wherein both the first and second electrically independent support faces are to capacitively impart a torque on the proof mass.

9. The vibratory gyro of claim 6, wherein the first grating comprises a plurality of first line elements in a first plane parallel to the plane of the support and regularly spaced in the second dimension, wherein the second grating comprises a plurality of second line elements separated in the third dimension from the first line elements, the second line elements regularly spaced in the second dimension and in a second plane parallel to the plane of the support.

10. The vibratory gyro of claim 9, wherein the multi-layer grating is one of a plurality of multi-layer gratings arrayed across the proof mass, wherein the plurality of first line elements in each first grating have a same pitch across the plurality of multi-layer gratings, the plurality of second line elements in each second grating have a same pitch across the plurality of multi-layer gratings, and wherein an offset between the first and second line elements is different across the plurality of multi-layer gratings.

11. The vibratory gyro of claim 10, wherein the plurality of multi-layer gratings comprises:
a first plurality of multi-layer gratings arrayed across a first side of the proof mass; and
a second plurality of multi-layer gratings arrayed across a second side of the proof mass, orthogonal to the first side.

12. An inertial sensor, comprising:
the bulk micromachined vibratory gyro of claim 1;
a light source having an emission wavelength to interrogate the multi-layer grating, wherein the emission wavelength is greater than a pitch of at least one of the first and second gratings; and
an optical detector to measure an intensity of zeroth-order light modulated by the multi-layer grating.

13. An inertial sensor, comprising:
a bulk micromachined vibratory gyro, comprising:
a square frame including a substrate having a bulk thickness;
a plurality of first gratings in a layer of the frame, the first gratings arrayed across each side of the frame;
a square proof mass disposed within the square frame and having substantially the bulk thickness, the proof mass attached to the frame via four flexures disposed at the corners of the proof mass and the frame; and
a plurality of second gratings in a layer of the proof mass, the second gratings arrayed across each side of the proof mass, wherein the first and second gratings overlap to form a plurality of multi-layer gratings, the multi-layer gratings arrayed in one dimension in a plane of the frame to have apertures that vary dimensionally in response to a drive force, and the multi-layer gratings arrayed in another dimension in the plane of the frame to have apertures that vary dimensionally in response to a rotation of the gyro.

14. The inertial sensor of claim 13, further comprising:
a light source having an emission wavelength to interrogate at least one multi-layer grating in each dimension, wherein the emission wavelength is greater than a regular spacing of at least one of the first and second gratings in each multilayer grating; and
an optical detector to measure an intensity of zeroth-order light modulated by each multi-layer grating interrogated.

15. The inertial sensor of claim 13, wherein the light source comprises a first light source to interrogate a first multi-layer grating in one dimension, and wherein the optical detector comprises a first optical detector to measure light from the first light source as modulated by the first multi-layer grating in response to the drive force.

16. The inertial sensor of claim 15, wherein the first optical detector is coupled to a feedback control circuit, the feedback control circuit further coupled to a capacitive drive element disposed in the frame.

17. The inertial sensor of claim 15, wherein the light source comprises a second light source to interrogate a second multi-layer grating in another dimension, and wherein the optical detector comprises a second optical detector to measure light from the second light source as modulated by the second multi-layer grating in response to the rotation.

18. An inertial sensor, comprising:
a first substrate having a bulk thickness and comprising:
a frame having at least the bulk thickness and having a first grating;
a proof mass having the bulk thickness disposed within the frame and having a second grating disposed above or below the first grating to form a multi-layer grating; and
a drive element to oscillate the proof mass in a first dimension in a plane of the frame; and a second substrate to expose the multi-layer grating to a wavelength of light that is to be modulated by the multi-layer grating in response to oscillation of the proof mass in a second dimension of the plane of the frame.

19. The inertial sensor of claim 18, further comprising:
an optical detector to measure an intensity of zeroth-order light reflected or transmitted by the multi-layer grating.

20. The inertial sensor of claim 18, wherein the bulk thickness is at least 500 μm, wherein a face of the proof mass extends in a third dimension through the bulk thickness, orthogonal to the first and second dimensions, the face of the proof mass separated from an opposing face of the frame by a gap extending through the bulk thickness of the first substrate, and wherein wavelength of light is greater than a feature size of the multi-layer grating.

* * * * *